(12) United States Patent
Lee

(10) Patent No.: US 7,973,869 B2
(45) Date of Patent: Jul. 5, 2011

(54) COLOR FILTER ON THIN FILM TRANSISTOR TYPE LIQUID CRYSTAL DISPLAY DEVICE INCLUDING SHIELDING LAYER AND METHOD OF FABRICATING THE SAME

(75) Inventor: Dong-Hoon Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/461,378

(22) Filed: Aug. 10, 2009

(65) Prior Publication Data

US 2009/0303407 A1      Dec. 10, 2009

Related U.S. Application Data

(62) Division of application No. 11/001,177, filed on Dec. 2, 2004, now Pat. No. 7,586,555.

(30) Foreign Application Priority Data

Apr. 30, 2004   (KR) .................. 10-2004-0030602

(51) Int. Cl.
    *G02F 1/136* (2006.01)
    *G02B 1/1339* (2006.01)
(52) U.S. Cl. ........................... 349/44; 349/155
(58) Field of Classification Search ............ 349/44, 349/155
    See application file for complete search history.

(56) References Cited

U.S. PATENT DOCUMENTS

| | | | |
|---|---|---|---|
| 5,128,786 A * | 7/1992 | Yanagisawa | 349/111 |
| 5,585,951 A | 12/1996 | Noda et al. | |
| 5,708,485 A | 1/1998 | Sato et al. | |
| 5,784,132 A | 7/1998 | Hashimoto | |
| 5,818,550 A | 10/1998 | Kadota et al. | |
| 5,828,434 A | 10/1998 | Koden et al. | |
| 6,304,308 B1 | 10/2001 | Saito et al. | |
| 6,429,917 B1 | 8/2002 | Okamoto et al. | |
| 6,449,024 B1 | 9/2002 | Hirakata et al. | |
| 6,583,846 B1 * | 6/2003 | Yanagawa et al. | 349/155 |
| 6,590,627 B2 * | 7/2003 | Tomioka et al. | 349/139 |

(Continued)

FOREIGN PATENT DOCUMENTS

CN           1427283         7/2003

(Continued)

*Primary Examiner* — K. Cyrus Kianni
(74) *Attorney, Agent, or Firm* — McKenna Long & Aldridge LLP

(57) ABSTRACT

A liquid crystal display device includes: first and second substrates facing and spaced apart from each other; a gate line and a data line on the first substrate, the gate line and the data line crossing each other to define a pixel region; a thin film transistor connected to the gate line and the data line, the thin film transistor including a gate electrode, a source electrode and a drain electrode; a first shielding layer covering a space between the source and drain electrodes; a color filter layer on the first shielding layer; a pixel electrode on the color filer layer; a black matrix on the second substrate, the black matrix corresponding to the gate line and the data line; a common electrode on the black matrix; a patterned spacer on the common electrode, the patterned spacer corresponding to the black matrix; and a liquid crystal layer between the pixel electrode and the common electrode.

20 Claims, 12 Drawing Sheets

U.S. PATENT DOCUMENTS

| | | |
|---|---|---|
| 6,597,413 B2 | 7/2003 | Kurashina |
| 6,597,420 B2 | 7/2003 | Kim et al. |
| 7,116,383 B2 | 10/2006 | Kim et al. |
| 2001/0022637 A1 | 9/2001 | Yu .................................. 349/102 |
| 2001/0033637 A1 | 10/2001 | Hasz et al. |
| 2003/0112405 A1 | 6/2003 | Kim et al. |
| 2003/0117573 A1 | 6/2003 | Yi et al. |
| 2003/0151715 A1 | 8/2003 | Kim et al. |
| 2004/0169810 A1* | 9/2004 | Fujimori et al. .............. 349/156 |

FOREIGN PATENT DOCUMENTS

| | | |
|---|---|---|
| CN | 1427052 | 8/2003 |

\* cited by examiner

COLOR FILTER ON THIN FILM TRANSISTOR TYPE LIQUID CRYSTAL DISPLAY DEVICE INCLUDING SHIELDING LAYER AND METHOD OF FABRICATING THE SAME

CROSS-REFERENCE TO RELATED APPLICATIONS

This application is a Divisional of application Ser. No. 11/001,177 filed Dec. 2, 2004, now U.S. Pat. No. 7,586,555 now allowed; which claims priority to Korean Patent Application No. 10-2004-0030602 filed Apr. 30, 2004, all of which are hereby incorporated by reference for all purposes as if fully set forth herein.

BACKGROUND OF THE INVENTION

1. Field of the Invention

The present invention relates to a liquid crystal display device, and to a method of fabricating a liquid crystal display device, particularly a color filter on thin film transistor (COT) type liquid crystal display (LCD) device and a method of fabricating the COT type LCD device.

2. Discussion of the Related Art

In general, liquid crystal display (LCD) devices make use of optical anisotropy and polarization properties of liquid crystal molecules to produce images. When an electric field is applied to liquid crystal molecules, the liquid crystal molecules are rearranged. As a result, the transmittance of the liquid crystal molecules is changed according to the alignment direction of the rearranged liquid crystal molecules.

The LCD device includes two substrates disposed with their respective electrodes facing each other, and a liquid crystal layer is interposed between the respective electrodes. When a voltage is applied to the electrodes, an electric field is generated between the electrodes to modulate the light transmittance of the liquid crystal layer by rearranging liquid crystal molecules, thereby displaying images.

FIG. 1 is an exploded perspective view of a liquid crystal display device according to the related art. In FIG. 1, a liquid crystal display (LCD) device 11 includes an upper substrate 5, a lower substrate 22 and a liquid crystal layer 14 interposed between the upper and lower substrates 5 and 22. A black matrix 6 is formed on the upper substrate 5 and a color filter layer 8 including sub-color filters is formed on the black matrix 6. A common electrode 18 is formed on the color filter layer 8. A pixel electrode 17 and a thin film transistor (TFT) "T" as a switching element are formed on the lower substrate 22 in a pixel region "P." The pixel electrode 17 is formed of a transparent conductive material such as indium-tin-oxide (ITO) and indium-zinc-oxide (IZO). The pixel region "P" is defined by a gate line 13 and a data line 15 and the TFT "T" disposed in matrix is connected to the gate line 13 and the data line 15. In addition, a storage capacitor "C" connected in parallel to the pixel electrode 17 is formed on the gate line 13. A portion of the gate line 13 is used as a first electrode of the storage capacitor "C", and a metal pattern 30 with an island shape, which is the same layer and the same material as the source and drain electrodes of the TFT "T," is used as a second electrode of the storage capacitor "C." Because the metal pattern 30 is connected to the pixel electrode 17, the same signal is applied to the metal pattern 30 and the pixel electrode 17.

The upper substrate 5 and the lower substrate 22 may be referred to as a color filter substrate and an array substrate. Because the LCD device 11 is obtained by attaching the upper substrate 5 having the color filter layer 8 and the lower substrate layer 22 having array elements such as the gate line 13, the data line 15 and the TFT "T," the LCD device 11 may deteriorate due to light leakage resulting from an alignment error. In order to overcome these problems, a color filter on TFT (COT) type has been suggested where a color filter layer is formed on the array substrate.

FIG. 2 is a schematic cross-sectional view of a COT type LCD device according to the related art. In FIG. 2, a COT type LCD device 40 includes a first substrate 50 having a TFT "T" and a color filter layer 68 in a pixel region "P" a second substrate 90 facing the first substrate 50, and a liquid crystal layer 80 between the first and second substrates 50 and 90. The first and second substrates 50 and 90 include a display region "DR" having the pixel region "P" and a non-display region "NDR" surrounding the display region "DR." In the display region "DR," the TFT "T" includes a gate electrode 52, an active layer 60, a source electrode 62 and a drain electrode 64. A gate line 54 and a data line (not shown) crossing each other to define the pixel region "P" are formed on the first substrate 50.

A color filter layer 68 including a red sub-color filter 68a, a green sub-color filter 68b and a blue sub-color filter (not shown) is formed on the TFT "T," the gate line 54, and the data line (not shown). The color filter layer 68 corresponds to the pixel region "P." In addition, a black matrix 71 and a shielding layer 70 are formed on the first substrate 50 including the color filter layer 68. The black matrix 71 is disposed in the non-display region "NDR" to thereby surround the display region "DR." The shielding layer 70 is disposed between the sub-color filters 68a and 68b in the display region "DR." The shielding layer 70 corresponds to a channel region "CH" of the TFT "T." A pixel electrode 74 connected to the drain electrode 64 through a contact hole 77 is formed on the color filter layer 68 and a first orientation film 76 is formed on the pixel electrode 74 for an initial alignment of liquid crystal molecules. A second orientation film 94 and a common electrode 92 are sequentially formed on the second substrate 90.

FIGS. 3A to 3E are schematic cross-sectional views showing a fabrication process of a first substrate for a COT type LCD device according to the related art.

In FIG. 3A, a thin film transistor (TFT) "T" including a gate electrode 52, a gate insulating layer 57, an active layer 60, a source electrode 62, and a drain electrode 64 is formed on a first substrate 50 in a display region "DR." The first substrate 50 includes the display region "DR" and a non-display region "NDR". The active layer 60 includes an intrinsic amorphous silicon layer 60a and an impurity-doped amorphous silicon layer 60b. The active layer 60 under the source and drain electrodes 62 and 64 has a double-layered structure of the intrinsic amorphous silicon layer 60a and the impurity-doped amorphous silicon layer 60b, while the active layer 60 in a channel region "CH" between the source and drain electrodes 62 and 64 has a single-layered structure of only the intrinsic amorphous silicon layer 60a. In addition, a gate line 54 is formed on the first substrate 50 in the display region "DR." A first passivation layer 66 is formed on the TFT "T." The first passivation layer 66 may be extended to the non-display region "NDR.".

In FIG. 3B, a color filter layer 68 including a red sub-color filter 68a, a green sub-color filter 68b, and a blue sub-color filter (not shown) is formed on the first passivation layer 66 in the display region "DR". The color filter layer 68 is formed by repeating sequential processes of coating and patterning a color resist. Portions of the first passivation layer 66 corresponding to the channel region "CH" and the drain electrode 64 are exposed for a shielding layer and a pixel electrode in a subsequent step.

In FIG. 3C, a shielding layer 70 and a black matrix 71 are formed on the first substrate 50 including the color filter layer 68. The shielding layer 70 and the black matrix 71 are formed of an opaque material such as chromium (Cr) or an organic material including carbon (C). The shielding layer 70 is formed over the channel region "CH" to prevent external light from entering into the channel region "CH" of the TFT "T." The black matrix 71 is formed in the non-display region "NDR" surrounding the display region "DR" to prevent light leakage at peripheral portions of the display region "DR.".

In FIG. 3D, a second passivation layer 73 is formed on the shielding layer 70 and the black matrix 71. The second passivation layer 73 has a drain contact hole 77 exposing the drain electrode 64 through the first passivation layer 66.

In FIG. 3E, a pixel electrode 74 is formed on the second passivation layer 73 in the pixel region "P" by depositing and patterning a transparent conductive material. The pixel electrode 74 is connected to the drain electrode 64 through the drain contact hole 77.

Although not shown in figures, a common electrode is formed on a second substrate. After the first and second substrates are formed, a sealant is formed at a boundary portion of one of the first and second substrates and spacers are sprayed on one of the first and second substrates. Then, the first and second substrates are attached to form a liquid crystal panel and a liquid crystal material is injected into the liquid crystal panel, thereby completing the COT type LCD device.

In the COT-type LCD device, however, because a cell gap is fixed by ball spacers, uniformity of the sprayed ball spacers is poor and the ball spacers may conglomerate. Accordingly, display quality may deteriorate due to light leakage resulting from the non-uniformity of the ball spacers.

SUMMARY OF THE INVENTION

It is an advantage of the present invention to provide a liquid crystal display device and a method of fabricating a liquid crystal display device having an improved quality, with moderate manufacturing costs.

This advantage is solved by the subject matter according to the independent patent claims.

Accordingly, the present invention is directed to a color filter on thin film transistor type liquid crystal display device and a method of fabricating a COT type LCD device that substantially obviate one or more of the problems due to limitations and disadvantages of the related art.

The present invention provides a COT type LCD device having a patterned spacer and a method of fabricating the same.

The present invention provides a COT type LCD device where a black matrix and an alignment key for attachment are formed on a second substrate and a method of fabricating the same.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device is provided, comprising first and second substrates facing each other, a gate line and a data line on the first substrate, the gate line and the data line crossing each other to define a pixel region, a shielding layer, a color filter layer on the shielding layer, a pixel electrode on the color filer layer, a black matrix formed on the second substrate, a common electrode on the black matrix, a patterned spacer formed on the common electrode, and a liquid crystal layer between the pixel electrode and the common electrode.

Further, a liquid crystal display device is provided, comprising first and second substrates facing each other, a gate line and a data line on the first substrate, the gate line and the data line crossing each other to define a pixel region, a shielding layer, a color filter layer on the shielding layer, a plurality of pixel electrodes in the pixel region, a plurality of common electrodes alternating with the plurality of pixel electrodes, a patterned spacer formed on the second substrate, and a liquid crystal layer between the color filter layer and the second substrate.

Moreover, a method of fabricating a liquid crystal display device is provided, comprising forming a gate line and a data line on a first substrate, the gate line and the data line crossing each other to define a pixel region, forming a shielding layer, forming a color filter layer on the shielding layer, forming a pixel electrode on the color filter layer, forming a black matrix on the second substrate, forming a common electrode on the black matrix, forming a patterned spacer on the common electrode, attaching the first and second substrate such that the pixel faces the common electrode, and forming a liquid crystal layer between the pixel electrode and the common electrode.

Beyond this, a method of forming a liquid crystal display device is provided, comprising forming a gate line and a data line on a first substrate, the data line and the gate line crossing each other to define a pixel region, forming a shielding layer, forming a color filter layer on the shielding layer, forming a plurality of pixel electrodes in the pixel region, forming a plurality of common electrodes alternating with the plurality of pixel electrodes, forming a patterned spacer on a second substrate, attaching the first and second substrates such that the color filter layer faces the second substrate, and forming a liquid crystal layer between the color filter layer and the second substrate.

Further, the liquid crystal display device may comprise an alignment key in an edge portion of the second substrate, wherein the alignment key may arranged in the same layer as the black matrix. Thus, a very efficient way of providing an alignment key is created.

Moreover, the liquid crystal display device may comprise a plurality of patterned spacers spaced apart from each other. With this configuration, a mechanically very stable structure can be obtained, and the space between the substrates is maintained at a very constant value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4B further includes a cross-section corresponding to a boundary portion of the COT type LCD device according to the first embodiment of the present invention.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 1:
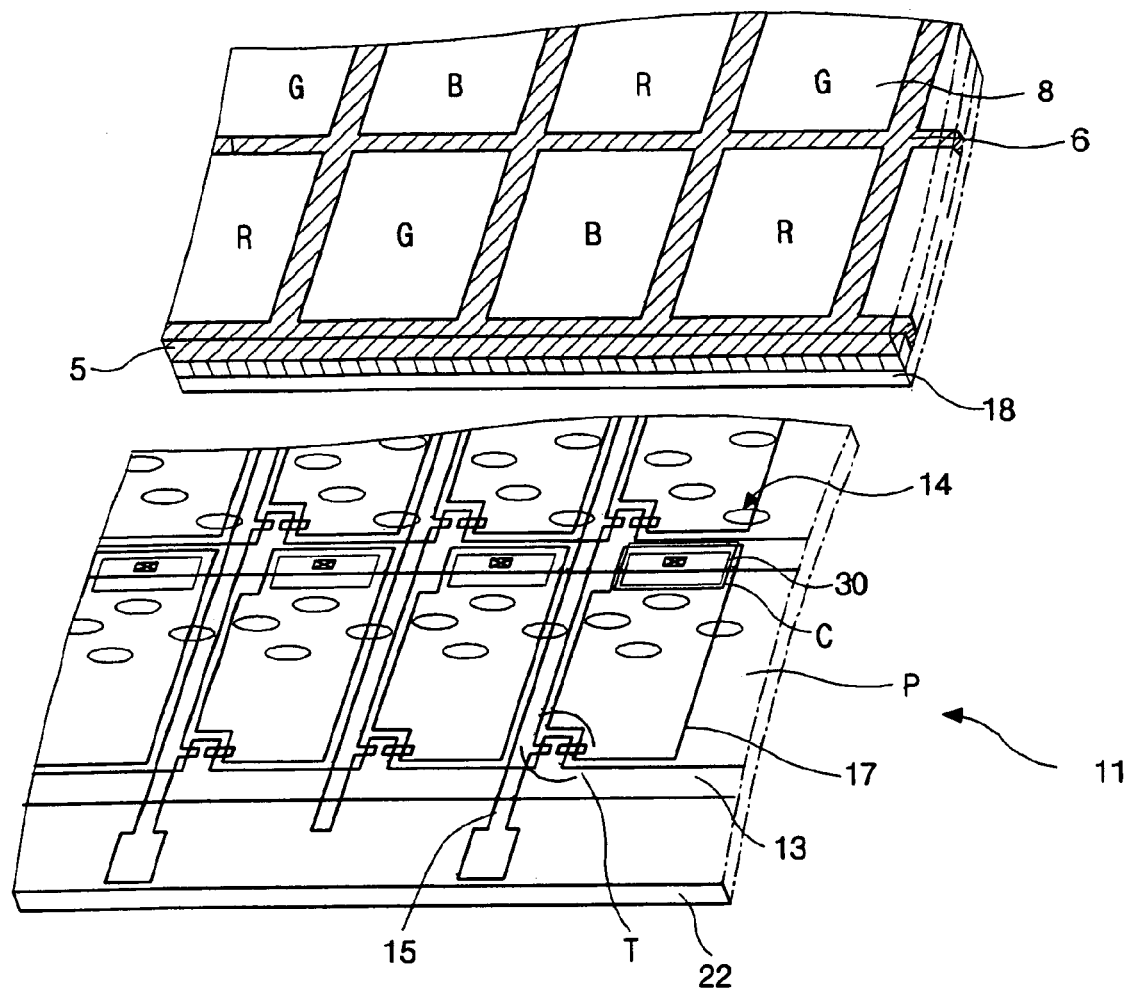
FIG. 1 is an exploded perspective view of a liquid crystal display device according to the related art.
Figure 2:
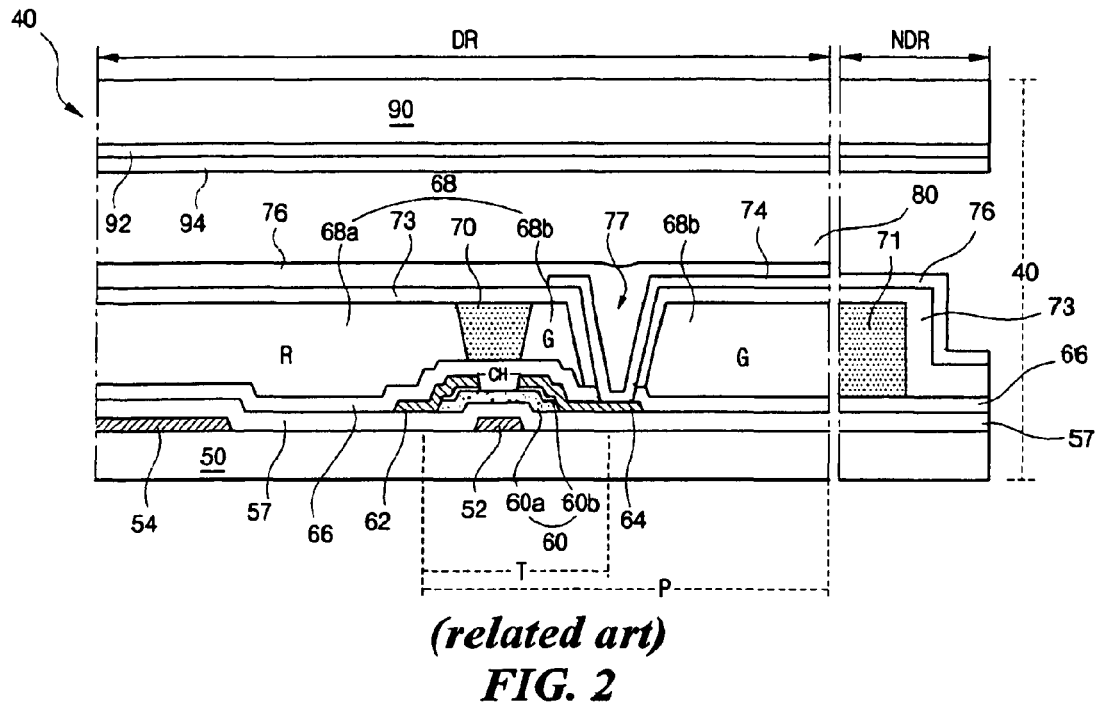
FIG. 2 is a schematic cross-sectional view of a COT type LCD device according to the related art.
Figure 3A:
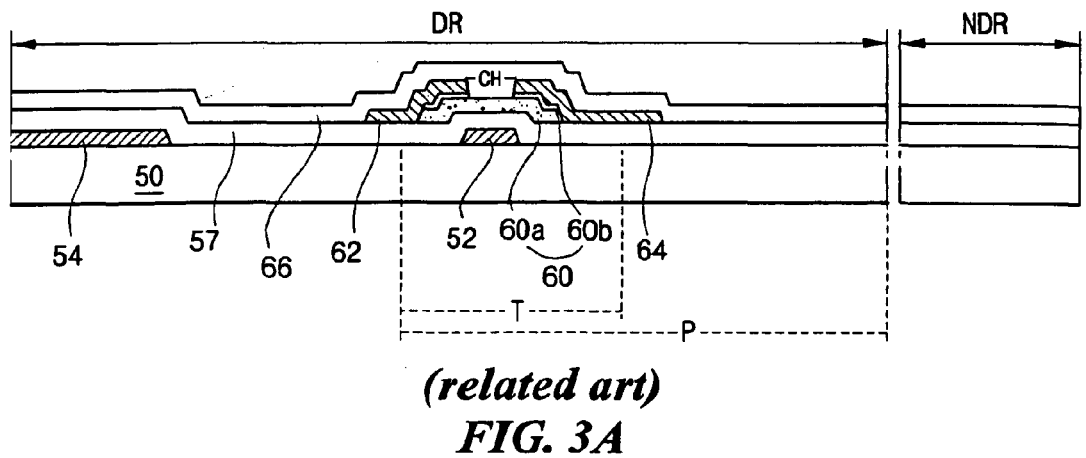
FIGS. 3A to 3E are schematic cross-sectional views showing a fabricating process of a first substrate for a COT type LCD device according to the related art.
Figure 3B:
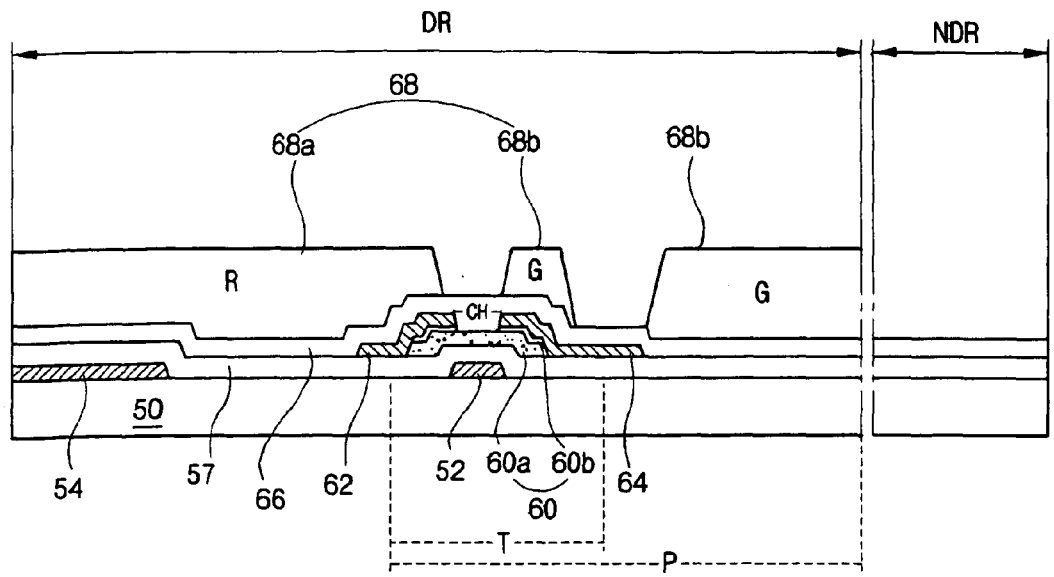
Figure 3C:
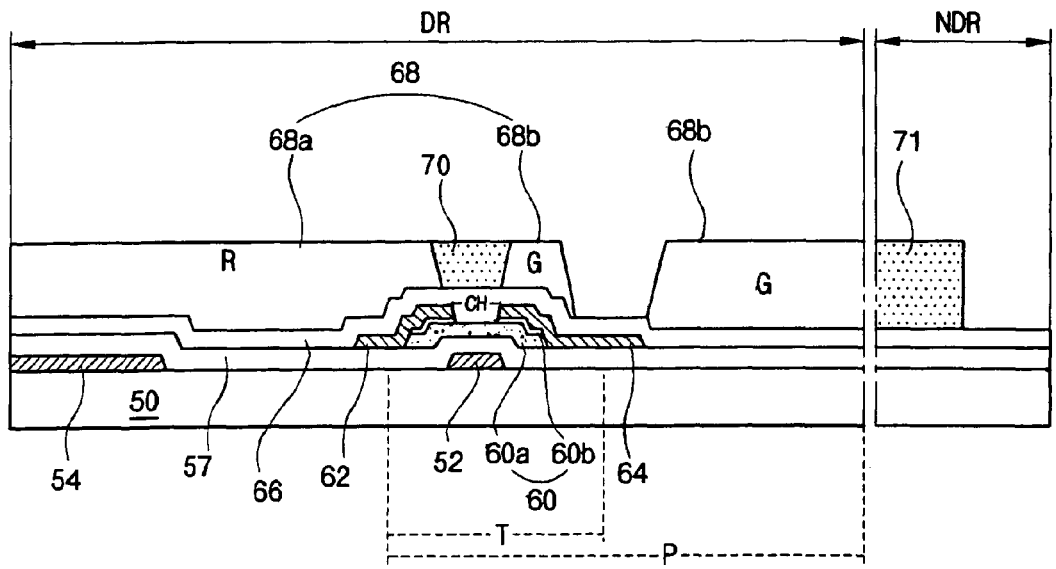
Figure 3D:
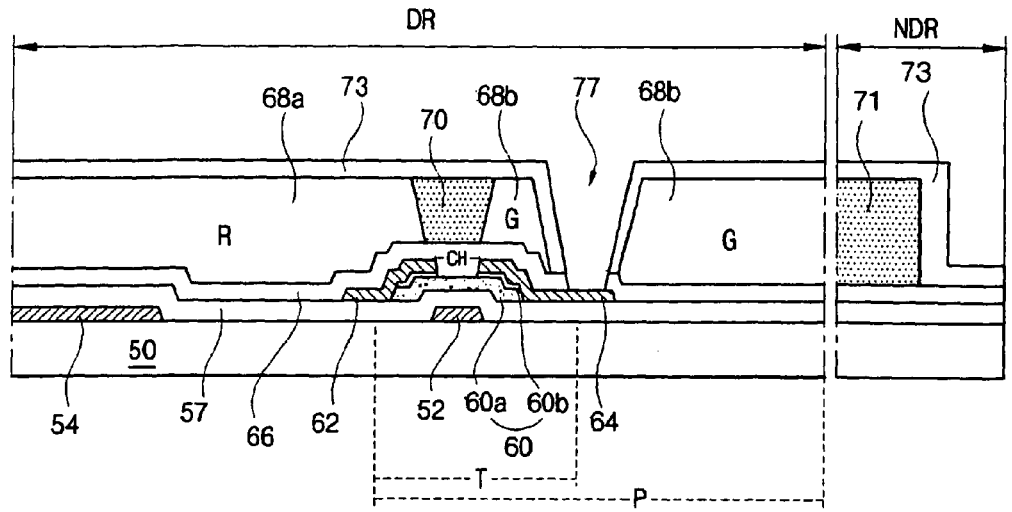
Figure 3E:
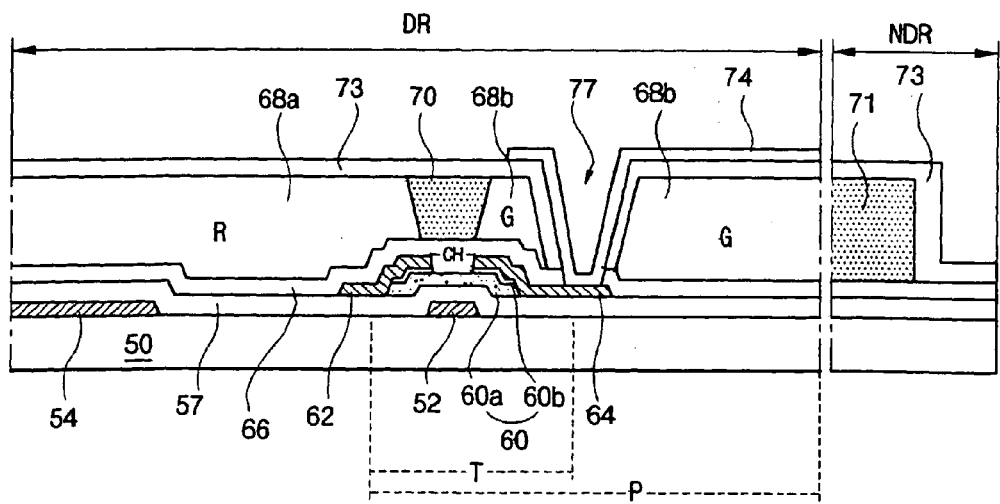
Figure 4A:
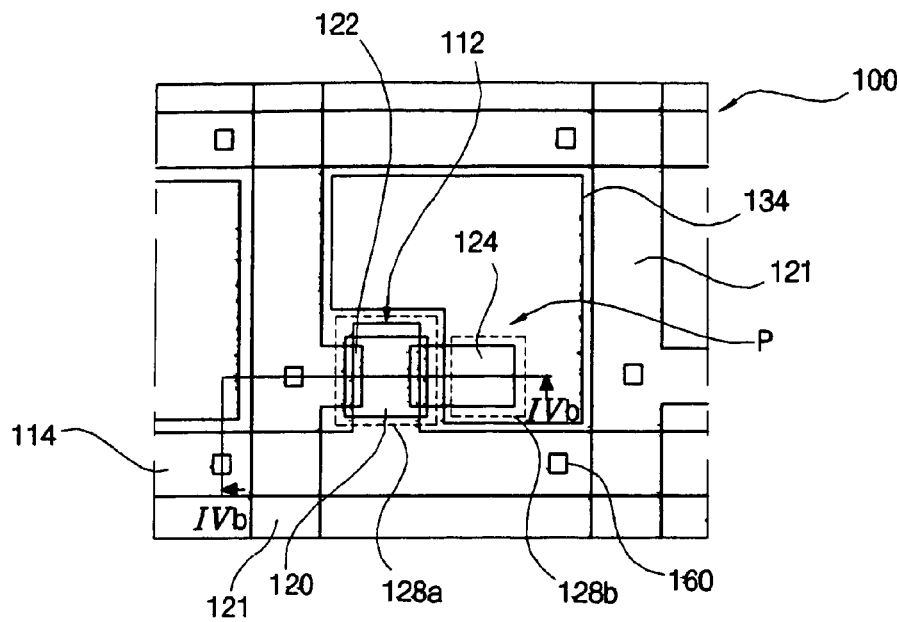
FIG. 4A is a schematic plan view of a COT type LCD device according to a first embodiment of the present invention.
Figure 4B:
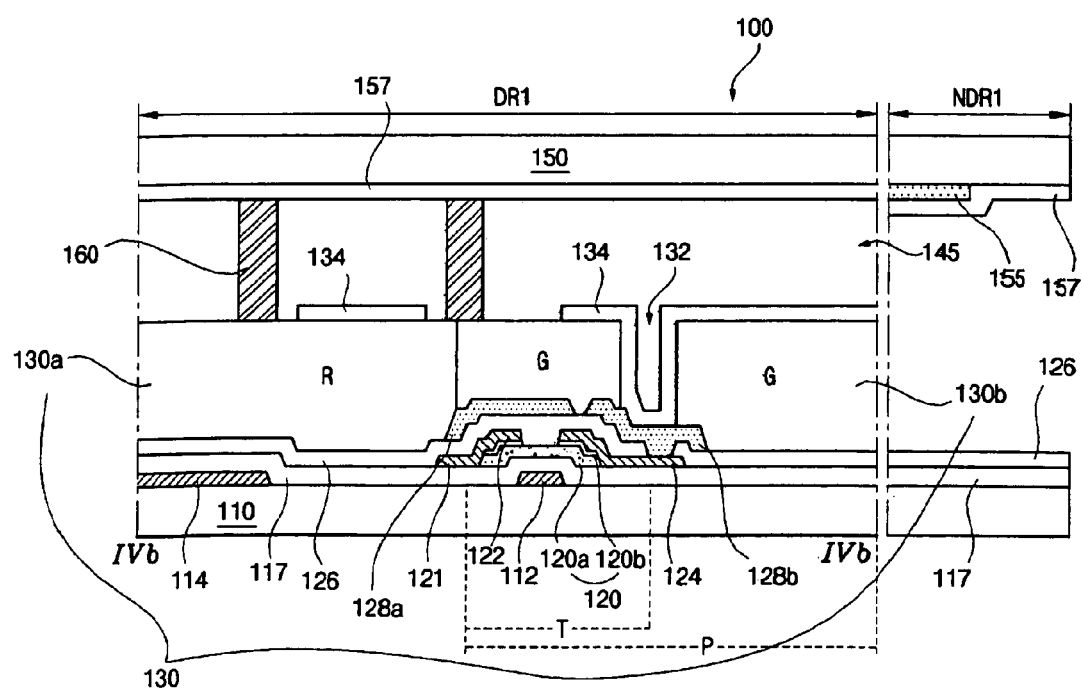
FIG. 4B is a schematic cross-sectional view taken along a line "IVb-IVb" of FIG. 4A.

FIG. 4A is a schematic plan view of a COT type LCD device according to a first embodiment of the present invention and FIG. 4B is a schematic cross-sectional view taken along a line "IVb-IVb" of FIG. 4A.

In FIG. 4A, a gate line 114 is disposed along a first direction and a data line 121 is disposed along a second direction perpendicular to the first direction. The gate line 114 and the data line 121 cross each other to define a pixel region "P." A thin film transistor (TFT) "T" including a gate electrode 112, an active layer 120, a source electrode 122 and a drain electrode 124 is connected to the gate line 114 and the data line 121. A plurality of patterned spacers 160 are formed to overlap the gate line 114 and the data line 121. The plurality of patterned spacers have a predetermined cross-sectional area and are spaced apart from one another. The patterned spacers 160 may be realized in the shape of column spacers. In addition, first and second shielding layers 128a and 128b is formed over the TFT "T."

In FIG. 4B, a COT type LCD device 100 includes first and second substrates 110 and 150 and a liquid crystal layer 145 interposed between the first and second substrates 110 and 150. The first and second substrate 110 and 150 include a display region "DR1" having a pixel region "P" and a non-display region "NDR1" surrounding the display region "DR1." The non-display region "NDR1" corresponds to the boundary portion of the COT type LCD device 100. A thin film transistor (TFT) "T" including a gate electrode 112, an active layer 120, a source electrode 122 and a drain electrode 124 is formed in the pixel region "P" of the first substrate 110. First and second shielding layers 128a and 128b are formed on a passivation layer 126 over the TFT "T." The second shielding layer 128b contacts the drain electrode 124 and a pixel electrode 134 on a color filter layer 130 contacts the second shielding layer 128b through a contact hole 132.

A black matrix 155 and an alignment key (not shown) are formed on the second substrate 150 in the non-display region "NDR1." The alignment key may be disposed at an edge portion of the second substrate 150. The first and second substrates 110 and 150 may be attached using the alignment key as a reference. A common electrode 157 is formed on the second substrate 150 including the black matrix 155 and a patterned spacer 160 is formed on the common electrode 157 in the display region "DR1". The patterned spacer 160 may correspond to the gate line 114 and/or the data line 121. The common electrode 157 may be formed of a transparent conductive material such as indium-tin-oxide (ITO) and indium-zinc-oxide (IZO).

FIGS. 5A to 5D are schematic cross-sectional views showing a fabricating process of a first substrate for a COT type LCD device according to the first embodiment of the present invention.

Figure 5A:
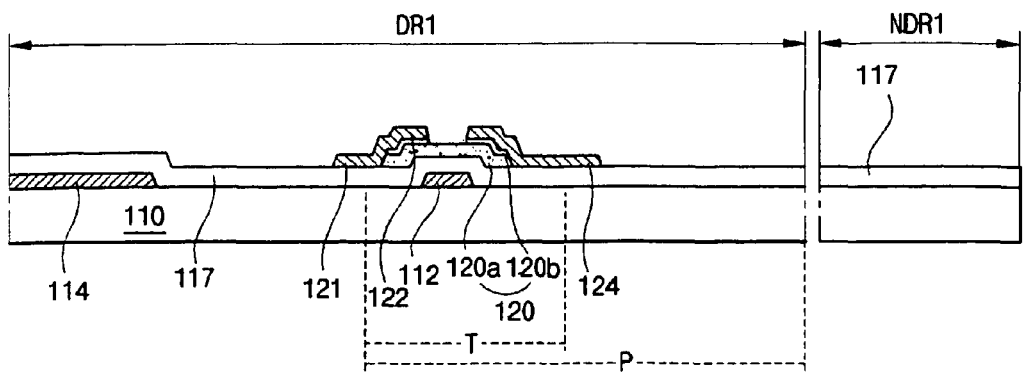
FIGS. 5A to 5D are schematic cross-sectional views showing a fabricating process of a first substrate for a COT type LCD device according to a first embodiment of the present invention.

In FIG. 5A, a thin film transistor (TFT) "T" including a gate electrode 114, an active layer 120, a source electrode 122 and a drain electrode 124 is formed on a first substrate 110 in a display region "DR1." The active layer 120 includes an intrinsic amorphous silicon layer 120a and an impurity-doped amorphous silicon layer 120b. In addition, a gate line 114 and a data line 121 are formed on the first substrate 110 in the display region "DR1." The gate line 114 and the data line 121 cross each other to define the pixel region "P." The gate electrode 112 is connected to the gate line 114 and the source electrode 122 is connected to the data line 121. A gate insulating layer 117 is formed between the gate electrode 112 and the active layer 120. The gate insulating layer 117 may be extended to the non-display region "NDR1."

Figure 5B:
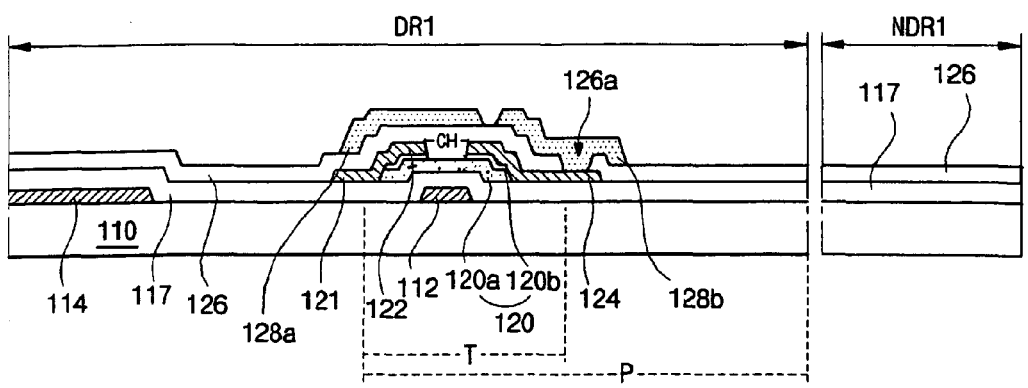

In FIG. 5B, a passivation layer 126 is formed on the TFT "T." The passivation layer 126 may be extended to the non-display region "NDR1." The passivation layer 126 may be formed of one of an inorganic insulating material and an organic insulating material through deposition method or a coating method. In addition, the passivation layer 126 has a first contact hole 126a exposing the drain electrode 124. First and second shielding layers 128a and 128b spaced apart from each other are formed on the passivation layer 126 by depositing and patterning an opaque metallic material. For example, chromium (Cr) or chromium oxide (CrOx) may be used for the first and second shielding layers 128a and 128b. The first shielding layer 128a covers a channel region "CH" of the TFT "T" and the second shielding layer 128b is connected to the drain electrode 124 through the first contact hole 126a.

Figure 5C:
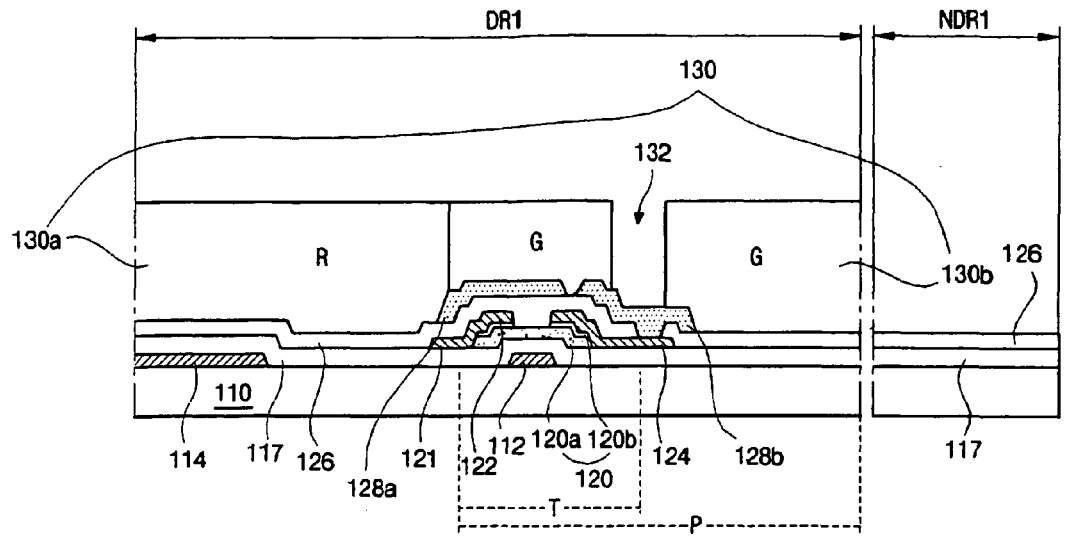

In FIG. 5C, a red sub-color filter 130a is formed on the first and second shielding layers 128a and 128b through a photolithographic process including coating, exposure and developing steps of a red resist. Similarly, a green sub-color filter 128b and a blue sub-color filter (not shown) are formed on the corresponding first and second shielding layers 128a and 128b, thereby completing a color filter layer 130. The color filter layer 130 is disposed in the display region "DR1." The red sub-color filter 128a, the green sub-color filter 128b and the blue sub-color filter (not shown) alternate with one another and repeat across the display region. In addition, the color filter layer 130 has a second contact hole 132 exposing the second shielding layer 128b.

Figure 5D:
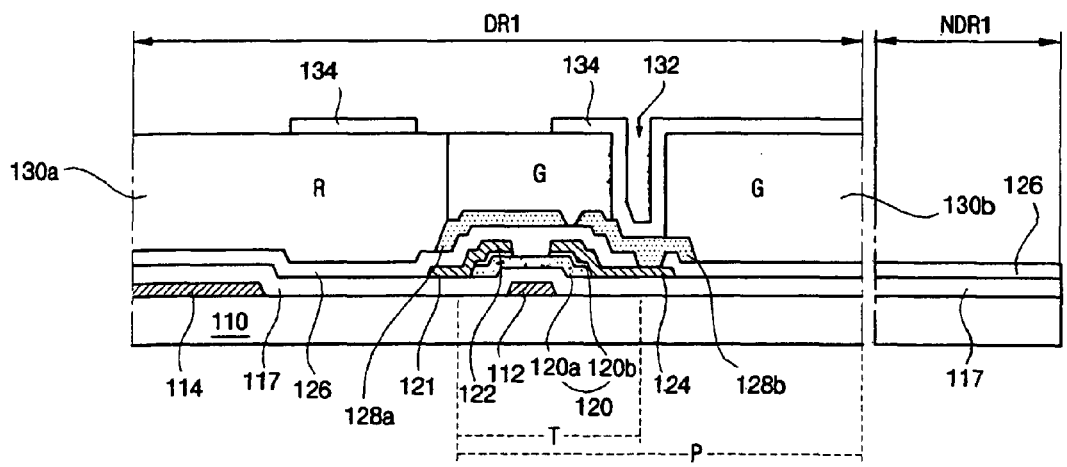

In FIG. 5D, a pixel electrode 134 is formed on the color filter layer 130 in the pixel region "P." The pixel electrode 134 may be formed of a transparent conductive material such as indium-tin-oxide (ITO) and indium-zinc-oxide (IZO) and is connected to the second shielding layer 128b through the second contact hole 132. Although not shown in FIG. 5D, another passivation layer of an organic material, which may function as a planarization layer, may be further formed between the pixel electrode 134 and the color filter layer 130.

FIGS. 6A to 6E are schematic cross-sectional views showing a fabricating process of a second substrate for a COT type LCD device according to the first embodiment of the present invention.

Figure 6A:
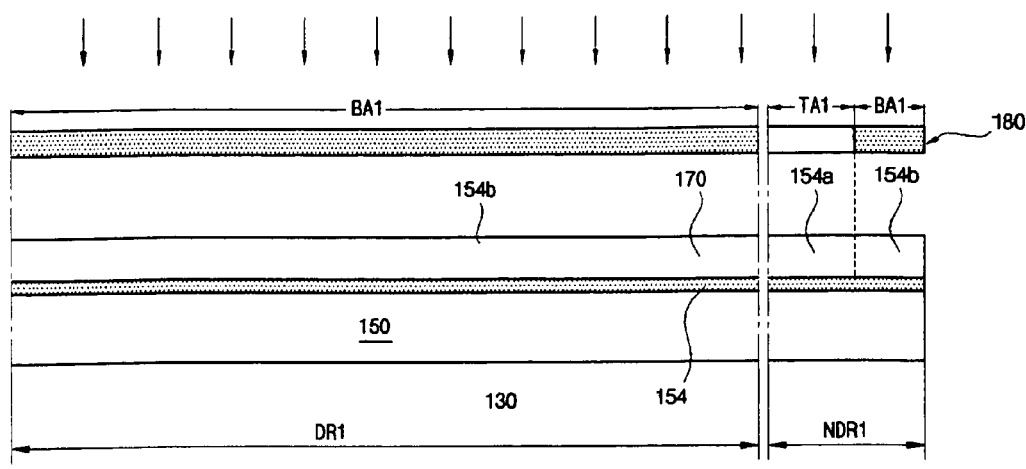
FIGS. 6A to 6E are schematic cross-sectional views showing a fabricating process of a second substrate for a COT type LCD device according to a first embodiment of the present invention.

In FIG. 6A, a shielding material layer 154 is formed on a second substrate 150 including a display region "DR1" and a non-display region "NDR1.". For example, the shielding material layer 154 may be formed of one of an organic material including carbon and a metallic material including chromium (Cr). A first mask 180 having a first transmissive area "TA1" and a first blocking area "BA1" is disposed over the shielding material layer 154. Light passes through the first transmissive area "TA1" while light does not pass through the first blocking area "BA1." The display region "DR1" corresponds to the first blocking area "BA1," and the non-display region "NDR1" corresponds to the first transmissive area "TA1" and the first blocking area "BA1."

A method of patterning the shielding material layer 154 may be determined on the basis of the shielding material 154. The shielding material layer 154 of an organic material may be formed through a photolithographic process including a coating step, an exposure step and a developing step of the organic material. The shielding material layer 154 of a metallic material may be formed through a photolithographic process including a coating step, an exposure step and a developing step of a photoresist (PR) on the shielding material layer 154 and an etching process of the shielding material layer 154 exposed through the PR. In FIG. 6A, for example, the shielding material layer 154 is formed of a metallic material including chromium (Cr) and a photoresist (PR) layer 170 is formed on the shielding material layer 154. After the first mask 180 is disposed over the PR layer 170, the PR layer 170 is exposed to light through the first mask 180. Accordingly, light is irradiated onto a first portion 154a corresponding to the first transmissive area "TA1" and light is not irradiated onto a second portion 154b corresponding to the first blocking area "BA1." Although not shown in FIG. 6A, the PR layer 170 is developed to form a PR pattern corresponding to the first transmissive area "TA1."

Figure 6B:
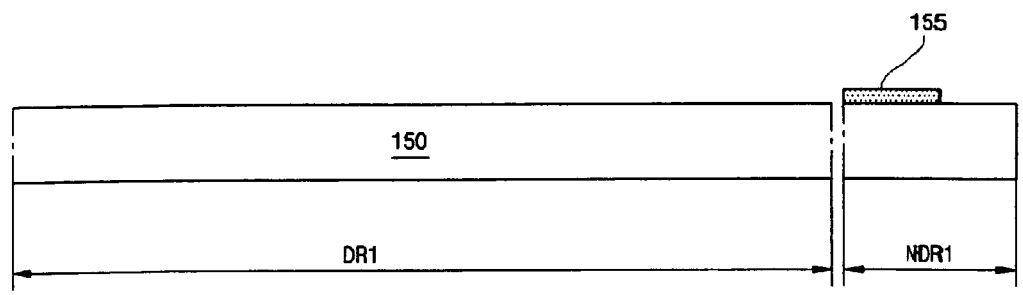

In FIG. 6B, the shielding material layer 154 of FIG. 6A is etched and then the PR pattern (not shown) is stripped, thereby forming a black matrix 155 corresponding to the first transmissive area "TA1." Even though a negative type PR is used in the first embodiment, a positive type PR may be used for the black matrix 155 in another embodiment. When a positive type PR is used, the first transmissive area "TA" and the first blocking area "BA1" are oppositely disposed.

Moreover, an alignment key (not shown) is formed in the non-display region "NDR1" surrounding the display region "DR1". In a subsequent attaching step, the first and second substrates 110 (of FIG. 5D) and 150 are aligned using the alignment key as a reference and attached using a sealant. The alignment key may be disposed on an edge portion of the second substrate 150.

Figure 6C:
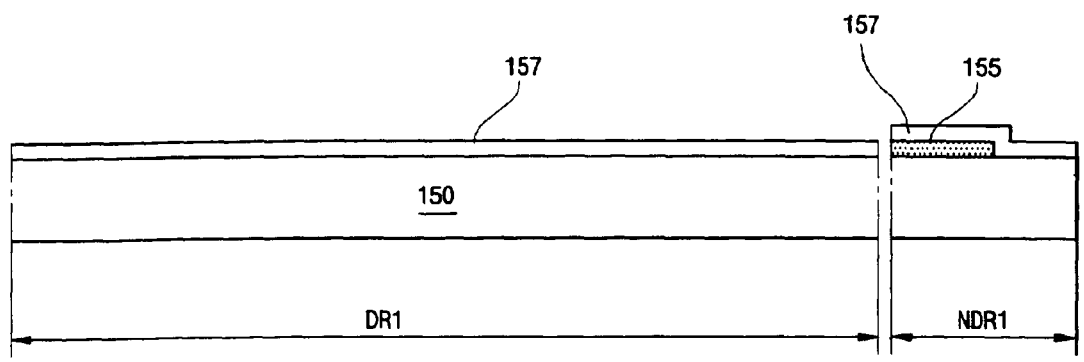

In FIG. 6C, a common electrode 157 is formed on the second substrate 150 including the black matrix 155 and the alignment key (not shown) by depositing a transparent conductive material such as indium-tin-oxide (ITO) and indium-zinc-oxide (IZO). The common electrode 157 may be disposed both in the display region "DR1" and in the non-display region "NDR1."

Figure 6D:
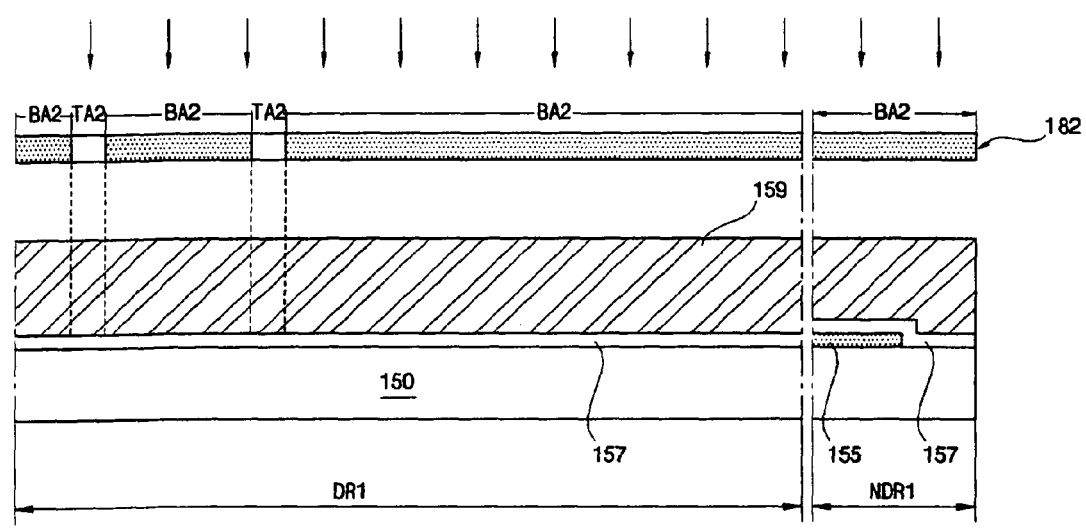

In FIG. 6D, an organic material layer 159 is formed on the common electrode 157 by coating an organic material such as benzocyclobutene (BCB), photo acryl, cytop and perfluorocyclobutene (PFCB). The organic material layer 159 may have a thickness of about 2 μm to about 8 μm. A second mask 182 having a second transmissive area "TA2" and a second blocking area "BA2" is disposed over the organic material layer 159 and then light is irradiated onto the organic material layer 159 through the second mask 182. The second mask 182 may be aligned to the second substrate 150 using the alignment key (not shown) as a reference.

Figure 6E:
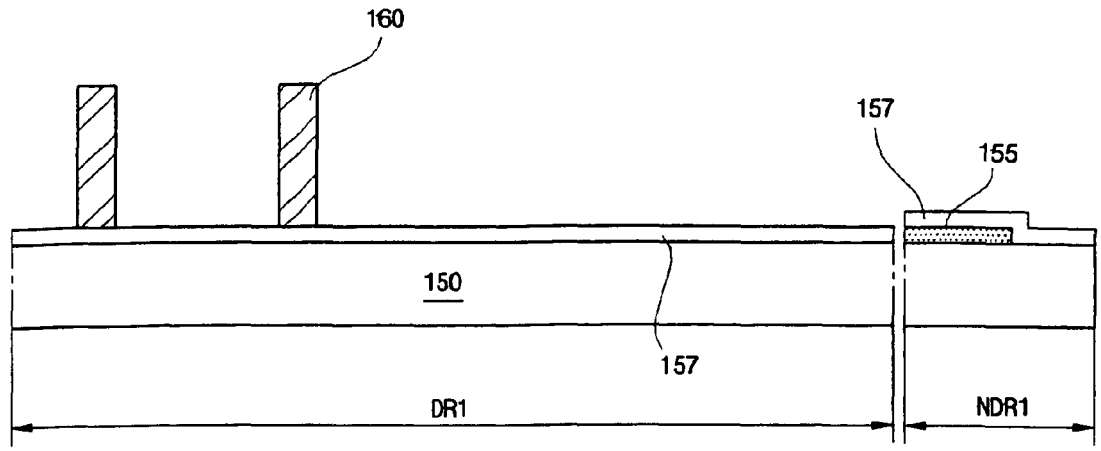

In FIG. 6E, the organic material layer 159 is developed (of FIG. 6D) to form a patterned spacer 160 corresponding to the second transmissive area "TA2" in the display region "DR1". Even though a negative type organic material is used in the first embodiment, a positive type organic material may be used for the patterned spacer 160 in another embodiment. When a positive type organic material is used, the second transmissive area "TA2" and the second blocking area "BA2" are oppositely disposed.

After the first substrate 110 is fabricated through a process of FIGS. 5A to 5D and the second substrate 150 is fabricated through a process of FIGS. 6A to 6E, a sealant (not shown) is formed on a boundary portion of one of the first and second substrates 110 and 150. The first and second substrates 110 and 150 are aligned and attached using the alignment key (not shown) as a reference. Then, liquid crystal materials are injected into a space between the first and second substrates 110 and 150, and an injecting hole is sealed to complete a COT type LCD device according to the first embodiment of the present invention.

On the other hand, the liquid crystal materials may be directly disposed on the second substrate 150, which is fabricated through the process of FIGS. 6A to 6E, by using a drop-filling method, and then the second substrate 150 may be attached to the first substrate 110, which is fabricated through the process of FIGS. 5A to 5D.

Figure 7:
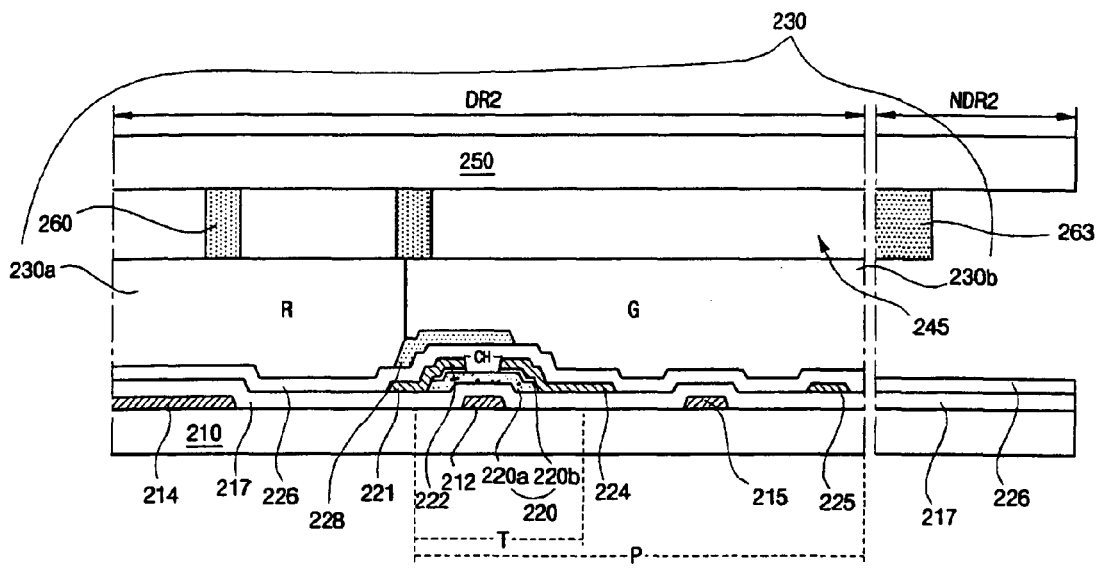
FIG. 7 is a schematic cross-sectional view of a COT type LCD device according to a second embodiment of the present invention.

FIG. 7 is a schematic cross-sectional view of a COT type LCD device according to a second embodiment of the present invention.

In FIG. 7, a COT type LCD device has an in-plane switching (IPS) mode where a pixel electrode and a common electrode are formed on the same substrate. A thin film transistor (TFT) "T" including a gate electrode 212, an active layer 220, a source electrode 222 and a drain electrode 224 is formed on a first substrate 210 in a display region "DR2". The active layer 220 may include an intrinsic amorphous silicon layer 220a and an impurity-doped amorphous silicon layer 220b. Moreover, a gate line 214 connected to the gate electrode 212 and a data line 221 connected to the source electrode 222 are formed on the first substrate 210. Although not shown in FIG. 7, the gate line 214 and the data line 221 cross each other to define a pixel region "P." A passivation layer 226 is formed on the TFT "T" and a shielding layers 228 is formed on the passivation layer 226. The passivation layer 226 may be extended to a non-display region "NDR2" surrounding the display region "DR2." The shielding layer 228 covers a channel region "CH" of the TFT "T" between the source and drain electrodes 222 and 224. A color filter layer 230 including a red sub-color filter 230a, a green sub-color filter 230b and a blue sub-color filter (not shown) is formed on the shielding layer 228 in the non-display region "NDR2". The red sub-color filter 230a, the green sub-color filter 230b and the blue sub-color filter (not shown) are alternately disposed in the pixel region "P." Although not shown in FIG. 7, another passivation layer, which may function as a planarization layer may be further formed on the color filter layer 230.

In the pixel region "P," a common electrode 215 and a pixel electrode 225 are alternately disposed. The common electrode 215 and the pixel electrode 225 may be formed of the same layer or of different layers. For example, the common electrode 215 may have the same layer as the gate line 214 and the pixel electrode 225 may have the same layer as the source and drain electrodes 222 and 224 in the second embodiment. Moreover, the common electrode 215 and the pixel electrode 225 may be formed of a transparent conductive material such as indium-tin-oxide (ITO) and indium-zinc-oxide (IZO) in another embodiment. Although not shown in FIG. 7, the pixel electrode 225 is connected to the drain electrode 224. The pixel electrode 225 and the drain electrode 224 may be formed in one body. When a voltage is applied to the common electrode 215 and the pixel electrode 225, a lateral electric field is generated between the common electrode 215 and the pixel electrode 225 and liquid crystal molecules may be re-arranged according to the lateral electric field.

A patterned spacer 260 and a black matrix 263 are formed on a second substrate 250 facing and spaced apart from the first substrate 210. Since the common electrode 215 is formed on the first substrate 210, the second substrate 250 may include the patterned spacer 260 and the black matrix 263. The patterned spacer 260 and the black matrix 263 are formed of the same material. The patterned spacer 260 is disposed in the display region "DR2" and the black matrix 263 is disposed in the non-display region "NDR2." A liquid crystal layer 245 is formed between the first and second substrates 210 and 250. The patterned spacer 260 maintains a cell gap, i.e., a thickness of the liquid crystal layer 245. The patterned spacer 260 corresponds to the gate line 214 and/or the data line 221 on the first substrate 210.

Figure 8:
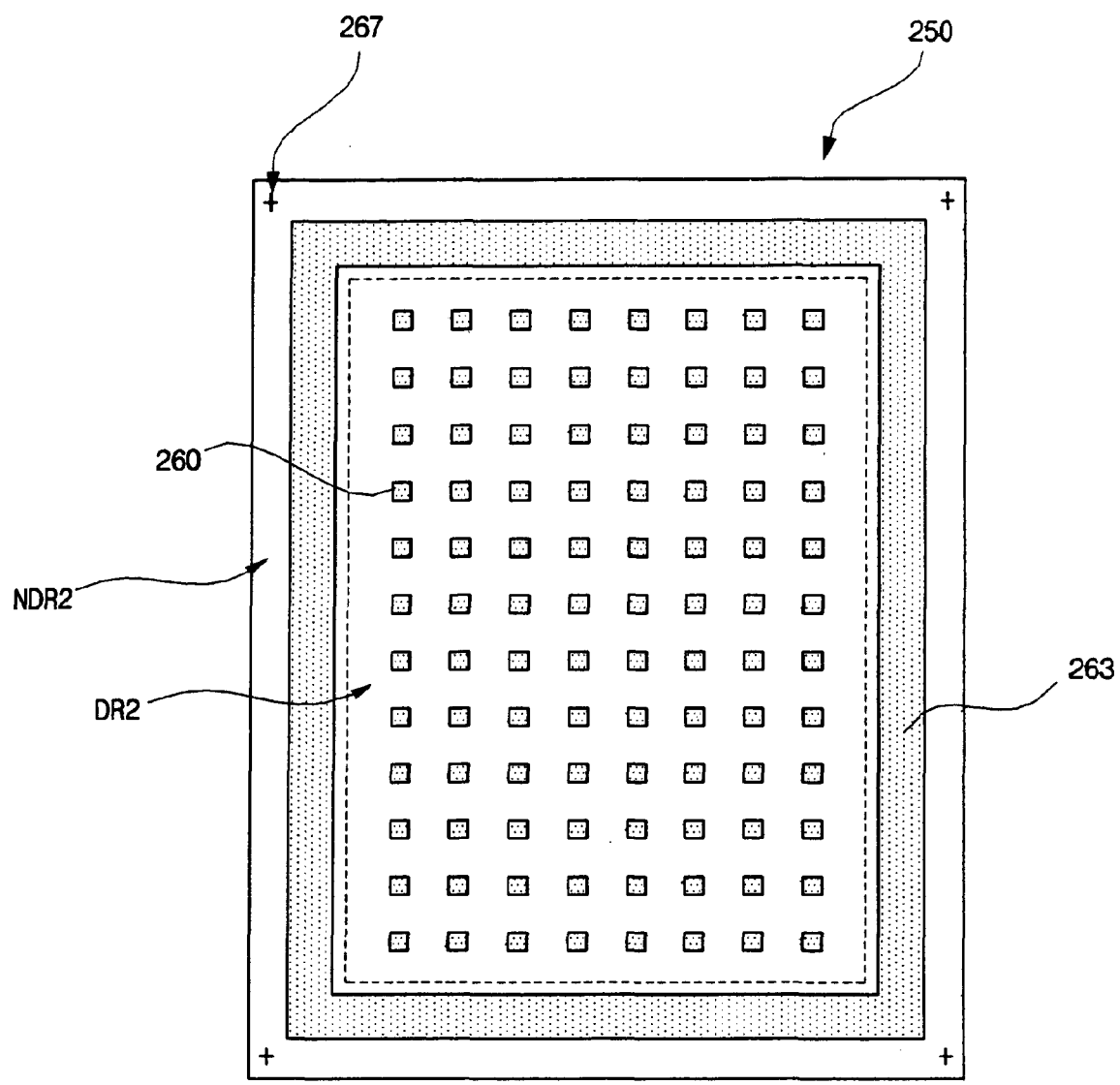
FIG. 8 is a schematic plan view of a second substrate for a COT type LCD device according to a second embodiment of the present invention.

FIG. 8 is a schematic plan view of a second substrate for a COT type LCD device according to a second embodiment of the present invention.

In FIG. 8, a second substrate 250 includes a display region "DR2" having a pixel region "P" and a non-display region "NDR2" surrounding the display region "DR2." A patterned spacer 260 is formed on the second substrate 250 in the display region "DR2" and a black matrix 263 is formed on the second substrate 250 in the non-display region "NDR2" to surround the display region "DR2." The patterned spacer 260 and the black matrix 263 are formed of the same material. An alignment key 267 is also formed on the second substrate 250 in the non-display region "NDR2." Accordingly, the alignment key 267 may be at an edge portion of the second substrate 250. The patterned spacer 260 of the display region "DR2" may include patterns arranged in a matrix shape to correspond to the gate line 214 (of FIG. 7) and the data line 221 (of FIG. 7) of the first substrate 210 (of FIG. 7). Because the patterned spacer 260 is formed of one of an organic material including carbon and a black resin, the patterned spacer 260 may be opaque. The patterned spacer 260 may have a thickness of about 2 μm to about 8 μm to maintain a cell gap.

The alignment key 267 may be simultaneously formed with the patterned spacer 260 and the black matrix 263. In order to align the patterned spacer 260 of the second substrate 250 to the gate line 214 (of FIG. 7) and the data line 221 (of FIG. 7) of the first substrate 210 (of FIG. 7), the first and second substrates 210 and 250 are attached using the alignment key 267 as a reference.

Figure 9A:
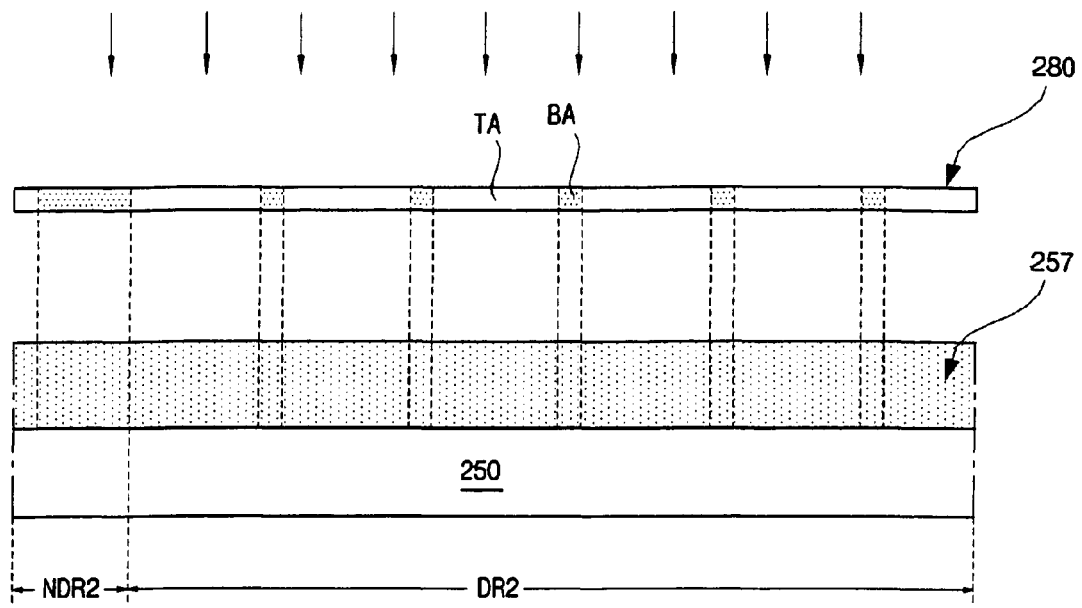
FIGS. 9A to 9B are schematic cross-sectional views showing a fabricating process of a second substrate for a COT type LCD device according to a second embodiment of the present invention.
Figure 9B:
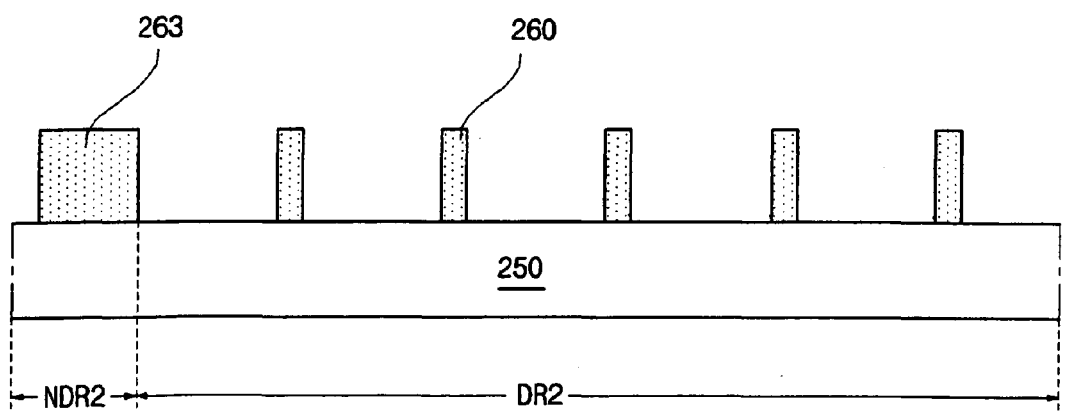

FIGS. 9A to 9B are schematic cross-sectional views showing a fabricating process of a second substrate for a COT type LCD device according to a second embodiment of the present invention.

In FIG. 9A, an organic material layer 257 may be formed on a second substrate 250 by coating an organic material including carbon or a black resin. The organic material layer 257 may have a predetermined thickness corresponding to a thickness of a liquid crystal layer, i.e., a cell gap of a COT type LCD device. The second substrate 250 has a display region "DR2" and a non-display region "NDR2" at periphery of the display region "DR2." After a mask 280 having a transmissive area "TA" and a blocking area "BA" is disposed over the organic material layer 257, light is irradiated onto the organic material layer 257 through the mask 280. Since the organic material layer 257 is a photosensitive property, one of irradiated portion and non-irradiated portion is removed after development. When the organic material layer 257 is a positive type, an irradiated portion is removed and a non-irradiated portion remains. When the organic material layer 257 is a negative type, an irradiated portion remains and a non-irradiated portion is removed. For example, the positive type organic material layer 257 is illustrated in FIG. 9A.

In FIG. 9B, a patterned spacer 260 is formed in the display region "DR" by developing the irradiated organic material layer 257 (of FIG. 9A). At the same time, a black matrix 263 is formed in the non-display region "NDR," i.e., an edge portion of the second substrate 250. Although not shown in the figure, an alignment key is also formed in the non-display region "NDR2." The patterned spacer 260, the black matrix 263, and the alignment key (not shown) may correspond to the blocking area "BA" of the mask 280 (of FIG. 9A). The patterned spacer 260 has a matrix shape corresponding to the gate line 214 (of FIG. 7) and the data line 221 (of FIG. 7) of the first substrate 210 (of FIG. 7).

In a subsequent process, a sealant (not shown) is formed on a boundary portion of one of the first and second substrates 210 and 250. Then, liquid crystal molecules are dispensed onto one of the first and second substrates 210 and 250 to form a liquid crystal layer. Next, the first and second substrates 210 and 250 are aligned and attached using the alignment key 267 as a reference, thereby completing a COT type LCD device according to the second embodiment of the present invention. As shown in FIG. 8, because the patterned spacer 260 has a matrix shape with a single body, the liquid crystal layer may be formed through a dispensing method. If the patterned spacer 260 has an open portion, an injection method may be used for the liquid crystal layer.

In a COT type LCD device according to the present invention, because a patterned spacer and a black matrix are formed on the second substrate, light leakage due to the conglomeration of the spacers is prevented. Accordingly, reduction of display quality is prevented. In addition, a fabrication process is simplified and a production cost is reduced by simultaneously forming a patterned spacer and a black matrix to maintain a cell gap and prevent light leakage.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing each other;
   a gate line and a data line on the first substrate, the gate line and the data line crossing each other to define a pixel region;
   a shielding layer;
   a color filter layer on a top surface of the shielding layer;
   a plurality of pixel electrodes in the pixel region;
   a plurality of common electrodes alternating with the plurality of pixel electrodes;
   a patterned spacer formed on the second substrate;
   a black matrix formed on the second substrate, wherein the patterned spacer and the black matrix are disposed directly on and contact a same surface of the second substrate; and
   a liquid crystal layer between the color filter layer and the second substrate.

2. The liquid crystal display device according to claim 1, further including a transistor connected to the gate line and the data line, the transistor including a gate electrode, a source electrode and a drain electrode.

3. The liquid crystal display device according to claim 2, wherein the transistor is a thin film transistor.

4. The liquid crystal display device according to claim 2, wherein the shielding layer is arranged such that it covers a space between the source and drain electrodes of the transistor.

5. The liquid crystal display device according to claim 1, wherein the patterned spacer is arranged corresponding to the gate line.

6. The liquid crystal display device according to claim 1, wherein the patterned spacer is arranged corresponding to the data line.

7. The liquid crystal display device according to claim 1, further including an alignment key on an edge portion of the second substrate.

8. The liquid crystal display device according to claim 6, wherein the alignment key is arranged in the same layer as the black matrix.

9. The liquid crystal display device according to claim 1, wherein the plurality of pixel electrodes are connected to the drain electrode.

10. The liquid crystal display device according to claim 1, further including a planarization layer between the color filter layer and the liquid crystal layer.

11. The liquid crystal display device according to claim 1, wherein the color filter layer includes a red sub-color filter, a green sub-color filter and a blue sub-color filter corresponding to the pixel region.

12. The liquid crystal display device according to claim 1, wherein the patterned spacer includes one of an organic material having carbon and a black resin.

13. The liquid crystal display device according to claim 1, wherein a thickness of the patterned spacer is substantially the same as a thickness of the liquid crystal layer.

14. The liquid crystal display device according to claim 1, wherein the patterned spacer has a thickness of about 2 µm to about 8 µm.

15. The liquid crystal display device according to claim 1, wherein the shielding layer includes one of chromium (Cr) and chromium oxide (CrOx).

16. A method of forming a liquid crystal display device, comprising:
   forming a gate line and a data line on a first substrate, the data line and the gate line crossing each other to define a pixel region;
   forming a shielding layer;
   forming a color filter layer on a top surface of the shielding layer;
   forming a plurality of pixel electrodes in the pixel region;
   forming a plurality of common electrodes alternating with the plurality of pixel electrodes;
   forming a patterned spacer on a second substrate;
   forming a black matrix on the second substrate, wherein the step of forming the patterned spacer is performed simultaneously with the step of forming the black matrix;
   attaching the first and second substrates such that the color filter layer faces the second substrate; and
   forming a liquid crystal layer between the color filter layer and the second substrate.

17. The method according to claim 16, further comprising the step of forming an alignment key on the second substrate, the alignment key being disposed in an edge portion of the second substrate.

18. The method according to claim 16, wherein the patterned spacer is arranged corresponding to the gate line.

19. The method according to claim 16, wherein the patterned spacer is arranged corresponding to the data line.

20. The method according to claim 17, wherein the step of attaching the first and second substrates uses the alignment key as a reference.

* * * * *